No. 874,668.　　　　　　　　　　　　　　　　PATENTED DEC. 24, 1907.
C. L. GELLERT & C. BUNSE.
PROCESS OF TREATING WASTE OAKUM AND SIMILAR MATERIALS.
APPLICATION FILED FEB. 28, 1907.
5 SHEETS—SHEET 1.
Fig. 1.
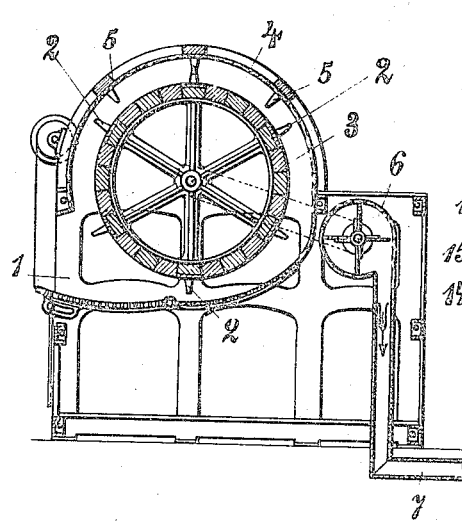
Fig. 2.
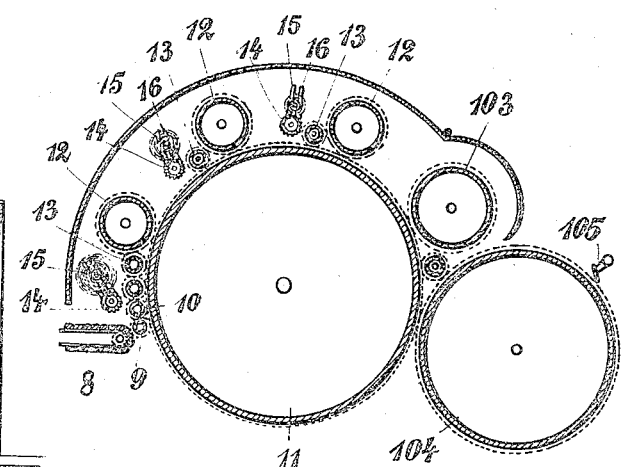
Fig. 2.a
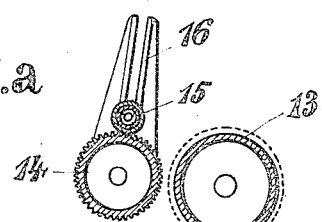
Fig. 3.
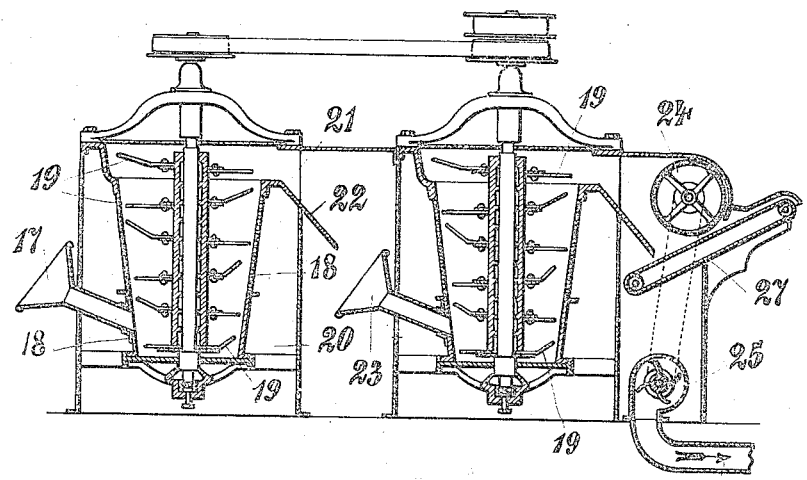

No. 874,668. PATENTED DEC. 24, 1907.
C. L. GELLERT & C. BUNSE.
PROCESS OF TREATING WASTE OAKUM AND SIMILAR MATERIALS.
APPLICATION FILED FEB. 28, 1907.

5 SHEETS—SHEET 2.

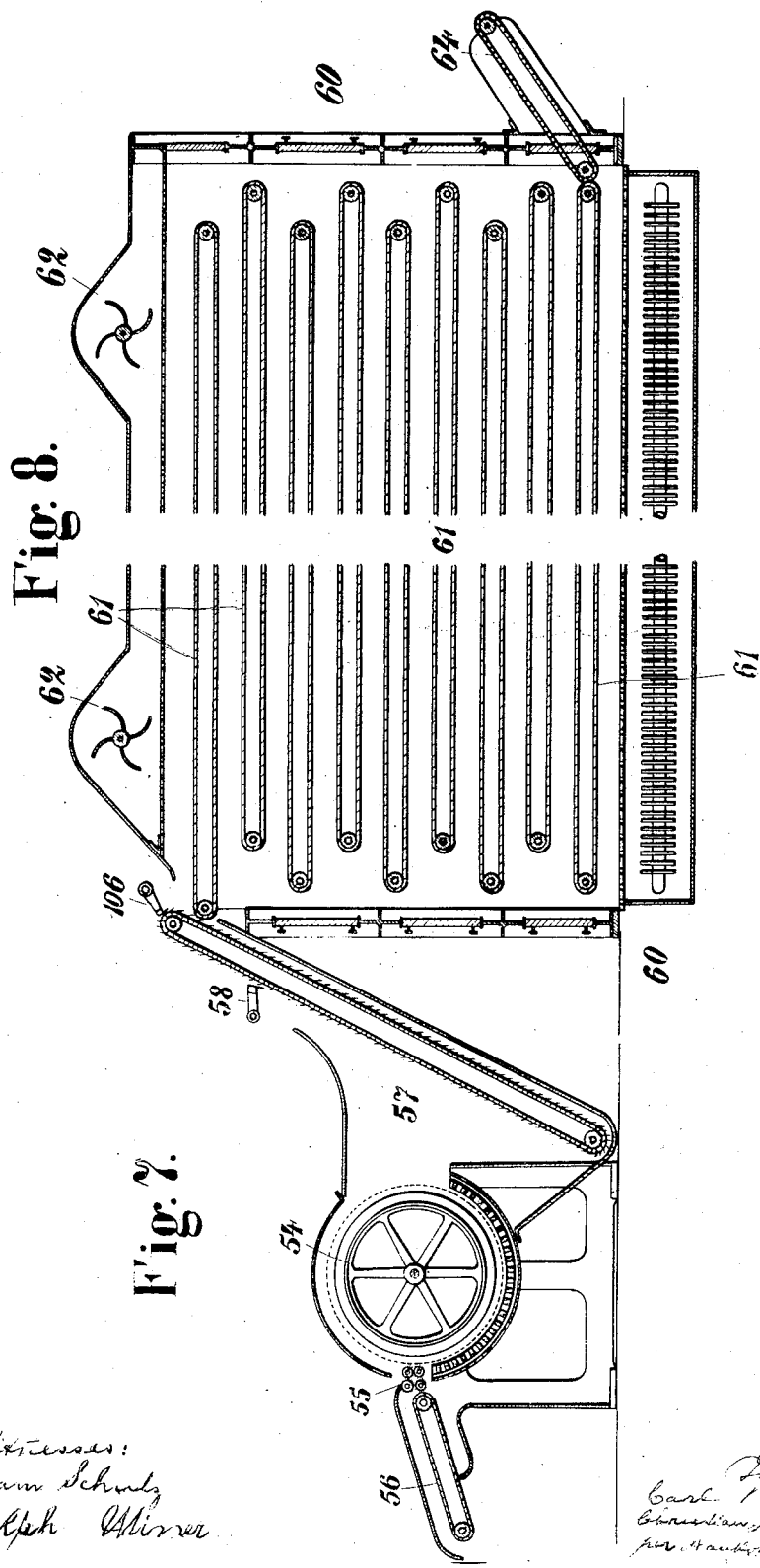

No. 874,668. PATENTED DEC. 24, 1907.
C. L. GELLERT & C. BUNSE.
PROCESS OF TREATING WASTE OAKUM AND SIMILAR MATERIALS.
APPLICATION FILED FEB. 28, 1907.

5 SHEETS—SHEET 4.

No. 874,668. PATENTED DEC. 24, 1907.
C. L. GELLERT & C. BUNSE.
PROCESS OF TREATING WASTE OAKUM AND SIMILAR MATERIALS.
APPLICATION FILED FEB. 28, 1907.

5 SHEETS—SHEET 5.

UNITED STATES PATENT OFFICE.

CHRISTIAN LOUIS GELLERT, OF DUSSELDORF, AND CARL BUNSE, OF BOCHOLT, GERMANY.

PROCESS OF TREATING WASTE OAKUM AND SIMILAR MATERIALS.

No. 874,668.

Specification of Letters Patent.

Patented Dec. 24, 1907.

Application filed February 28, 1907. Serial No. 359,817.

*To all whom it may concern:*

Be it known that we, CHRISTIAN LOUIS GELLERT and CARL BUNSE, both citizens of Germany, and residents, respectively, of Dusseldorf and Bocholt, Westphalia, Germany, have invented new and useful Improvements in Processes of Treating Waste Oakum and Similar Materials, of which the following is a specification.

In consequence of the brittleness of their fibers and the large amount of impurities and particles of straw which they contain waste oakum and waste tow have been used hitherto only in the making of objects of small value such as bolsters, mats, bags etc.

This invention relates to a process according to which waste oakum or waste tow is freed from all impurities by suitable mechanical and chemical means, and the fibers thereof made pliable and clean, so that they can be used as wadding for dressings, or be spun in the curled state. This material is finer and better than cotton wool and it is very hygroscopic has considerable luster and is stronger than cotton wool.

Figure 4:
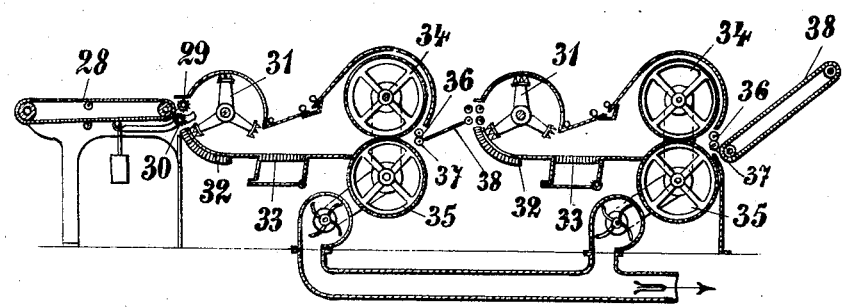
Figure 5:
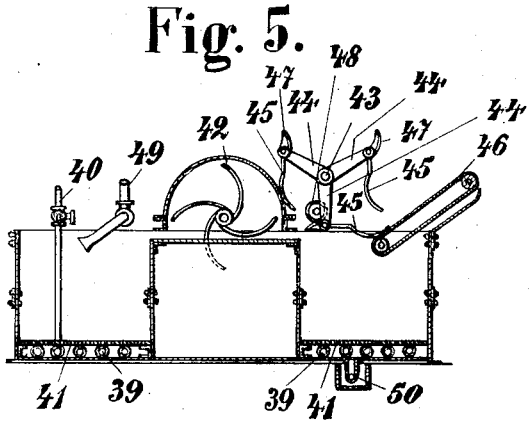
Figure 6:
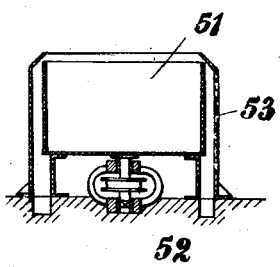
Figure 9:
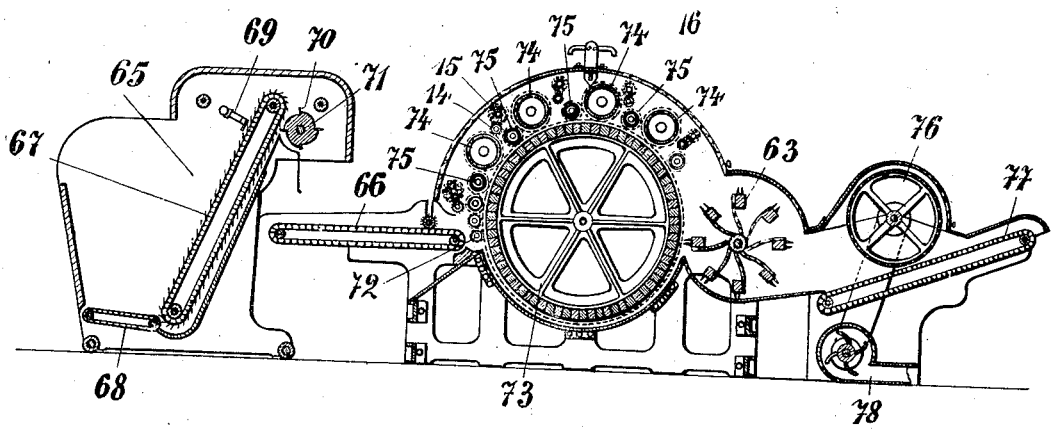
Figure 10:
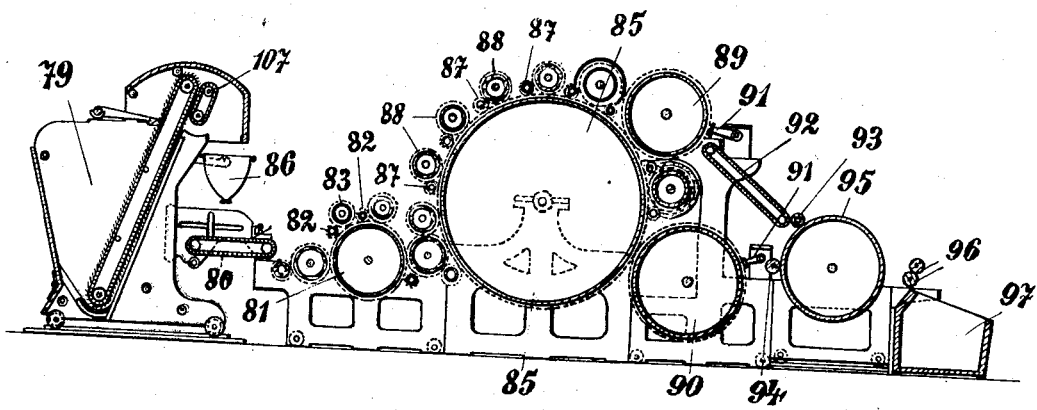
Figure 11:
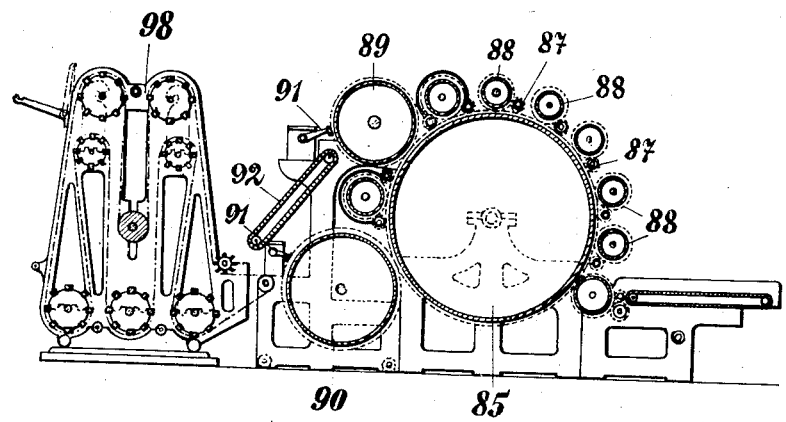
Figure 12:
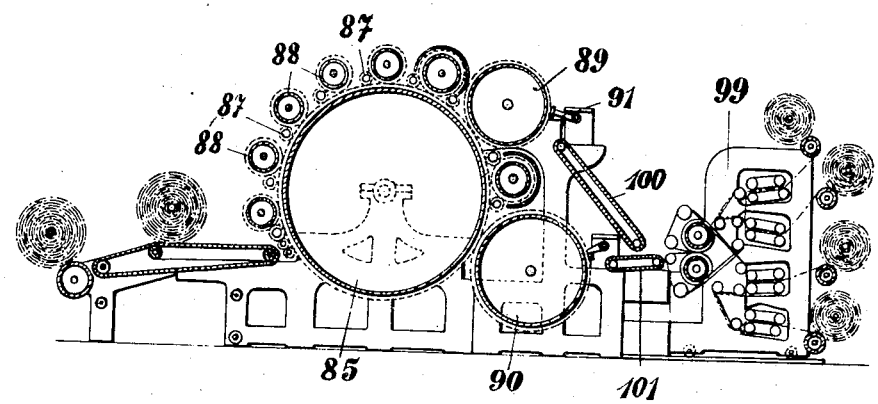
Figure 13:
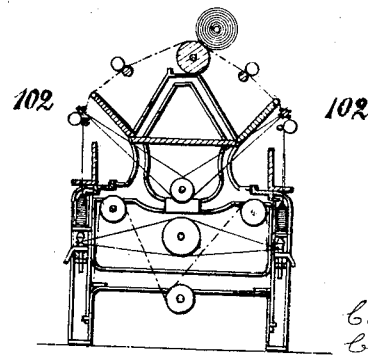

In the accompanying drawings: Figure 1 is a vertical section of the willow used in carrying out our invention; Fig. 2 a similar section through part of the first carding device; Fig. 2ª a detail of part of the same; Fig. 3 a vertical section of the devil; Fig. 4 a similar section through the beating machine; Fig. 5 a similar section through the washing apparatus; Fig. 6 a similar section through the centrifugal apparatus; Fig. 7 a similar section through the fiber opening mill; Fig. 8 a similar section through the drying apparatus; Fig. 9 a similar section through the second carding device; Fig. 10 a similar section through the first breaking device; Fig. 11 a similar section through the second breaking device; Fig. 12 a similar section through the roving device, and Fig. 13 a similar section through the throstle.

After being freed from particles of wood and other matters by means of a shaking device the material undergoes its first treatment in the willow (Fig. 1). The waste material introduced into the machine at 1 is seized by the steel prongs 2 of the drum 3 and thrown against prongs 5 arrayed on the side 4 of the casing, whereby the unopened agglomerated fibers are pulled apart and loosened and partially freed from the particles of straw adhering to them. The fan 6 draws off the resulting impurities and forces them out through the pipe 7. The material is then conveyed by means of the endless conveyer 8 to a carding device (Fig. 2). which is furnished with a special apparatus through the medium of which the waste thrown out of the material from time to time by the clearers is intercepted and collected.

The material conveyed by the table 8 to the taking in cylinders 9 10 is delivered to the drum 11 furnished with teeth and is worked between the drum 11 and the workers 12. The material carried along by the workers 12 is again conveyed to the drum by the clearers 13. In front of each clearer a smooth or suitably grooved rotary cylinder 14 is arranged and on this a cylinder 15 which is covered with felt or similar material and movably seated in forks 16.

The impurities thrown out are intercepted by the cylinder 14 and as it rotates are conveyed to the cylinder 15 to the felt or similar covering of which they adhere and as that cylinder is set in rotation by the cylinder 14 they are wound and collected. In consequence of being seated in forks the cylinder 15 is always moved correspondingly to the increase in the circumference. The different cylinders 15 are then taken out from time to time, the waste stripped off and are then put in again. Three devices are shown or more than three with clearers and workers may be arranged. A cylinder 103 serves for loosening the material which is taken off by the cylinder 104 whence it is removed by the comb 105. The second cleaning of the material is effected in a conical double devil or Brighton opener (Fig. 3.). The material thrown into the feed hopper 17 enters the perforated cylinder 18 where it is seized by the staves or beaters 19 situated on a rapidly rotating shaft and is thrown against the perforated cylinder 18 whereby coarse dust and waste are forced outwards into the chamber 20 through the openings in the cylinder.

Through the spiral like arrangement of the beaters and the centrifugal force the material is moved upwards leaves the devil at 21 and reaches a chute 22 along which it passes into the feed hopper 23 of the second conical devil. On this a perforated drum 24 is arranged against which the loosened material is thrown, a fan 25 which is connected with the interior of the drum drawing off the impurities and forcing them away through the pipe 26. From the drum the material now considerably loosened and in a fleece like state reaches the feeder 27 by which it is conveyed to a double beating machine (Fig. 4.). The feeder 27 conveys the material to the feeder 28 which delivers it to the taking in cylinders 29, 30, which then conveys it to beaters 31 furnished with rods or teeth. The beaters make 1000 revolutions per minute and the material undergoes vigorous but improving treatment and complete cleaning and separation of the fibers are obtained. The beaters 31 throw the material past the bars 32, 33, against the perforated drums 34, 35, the interior of which are likewise in communication with a fan, which draws off the dust out of the material thrown against the drum. The drums 34, 35, push the material between the cylinders 36, 37, whence it reaches the inclined way 38 and passes into the second beating machine. In the two beating machines not only are any impurities still contained in the material removed, but the coarser fibers are separated into finer fibers, which is of great importance as regards the subsequent spinning.

The further treatment is effected by baths, which besides cleaning also separate the fibers. Fig. 5 represents a washing apparatus. The annular receptacle for the bath and the material is furnished at the bottom with heating tubes 39, to which steam is conveyed through the pipe 40. Above the heating tubes a grating 41 is arranged on which the material lies. In the upper part of the receptacle a paddle wheel 42 is provided which is set in rotation and so causes a circulation of the liquid and a movement of the material. Moreover on the receptacle a shaft 43 is seated that carries arms 44 to which hooks 45 are linked. When the shaft rotates these dip into the receptacle carry the material along outwards and convey it on to a conveying cloth 46. The hooks 45 which ordinarily hang downwards, when moved upwards out of the receptacle come with an extension 47 under a roller or the like 48 which moves the hooks into a horizontal position. The liquid is conveyed to the receptacle through the pipe 49 above and is run off through the pipe 50 below.

The following baths are suitably employed. The first bath which is specially intended for removing the gum from the fibers consists of a 3 per cent. boiling solution of ammonia soda. Then follows a cold washing bath. The third bath consists of a 10 per cent. solution of caustic lye, in which the fibers are brought to a curling condition. Then follows another washing bath. The following bath serves specially for making the fibers pliable and consists of a solution of soap and sal ammoniac of a strength suited to the origin and character of the fibers. The last bath is a washing bath. The material is suitably conveyed from one bath to the other between smoothing rollers. In connection with the last bath however, the material without being conveyed between the cylinders, in order that it may not be felted by the pressure thereof, is conveyed directly into a centrifugal machine (Fig. 6.) where the material is dehydrated.

The centrifugal machine consists of the perforated inner casing 51 for the reception of the material which is set in rotation by means of the belt pulley 52, and the outer casing 53. In order to open the fibers again the material is now brought into an opening mill (Fig. 7). This consists of the drum 54 furnished with pins and the grooved cylinders 55, to which the material is conveyed by the conveying cloth 56. The drum throws the material from the grooved cylinder and on to the conveying cloth 57 furnished with prongs. This latter conveys the material past a hook 58 which removes the superfluous material carried along, and then brings it against a comb 106 which releases the material from the conveying cloth and conveys it to a drying apparatus (Fig. 8.). In a casing 60 heating tubes are arranged, below and above these a number of endless conveying bands 61 made of wire. Fans 62 draw the heated air uniformly through the whole casing 60. The conveying bands are so arranged in different planes that the material passes from the uppermost band on to the band below and so on being always moved longitudinally through the casing by each separate band. The lowest conveying band delivers the material to a conveying band 64 which conveys it outwards. The material is then placed in a carding device (Fig. 9) in order that it may be thoroughly loosened. This is furnished with a feed device 65 which brings the material uniformly to the feed table 66 of the carding device. The feed device consists of a conveying band 67 likewise furnished with pronged wire, to which the material is conveyed by the accompanying cloth 68, a hook 69 that removes material carried forward in excess and a cylinder 71 furnished with beaters 70 which throw the material on to the feed table 66 after removing it from the conveying band 67. The table 66 delivers the material to the cylinders 72 which convey it to the drum 73 furnished with cards. The treatment of the material then proceeds in a similar manner as in the machine shown in Fig. 2. Workers 74 and clearers 75 are provided as well as the apparatus for intercepting and collecting the waste thrown off by the clearers that is to say grooved cylinders 14 and cylinders 15 covered with felt or the like and movably seated in a fork 16. The rotary beaters 63 furnished with teeth or prongs throw the fibrous material from the drum and against a perforated drum 76 which conveys it to the feeder 77. The drum 76 is likewise in communication with a fan 78.

The further treatment of the material is effected on a special carding machine (Figs. 10 11 12). On the first machine provided with a spreading apparatus 79 (Fig. 10) the fibers are placed parallel and worked into a fleece. The feed device is similar to that shown in Fig. 9 but the material is removed from the pronged conveying cloth by means of a lifting device 107 which conveys it to a scale 86 by which having been mechanically weighed it is delivered to the feed table 80 whence it reaches the preliminary drum 81 furnished with indentations, the clearers 82 and workers 83 and then passes on to the drum 85 and the clearers 87 and workers 88. The cylinders 89 and 90 remove the material from the drum and since it is released by the combs 91 convey it through the medium of the conveying cloth 92 and the cylinders 93, 94, to the breaker cylinder 95 whence it is conveyed to a receiver 97 or direct to the second breaker (Fig. 11.) This has substantially the same parts as the first breaker, but the material passes from the drum into the fleecing apparatus 98 where the fibers are united as a uniformly thick fur and curled. The material can now be used as wadding for dressing or be spun. In the latter case the material is made into coarse roving, by roving machine (Fig. 12). The rover which is constructed substantially like the first breaker is combined for this purpose with a special fleecing apparatus 99, to which the material is conveyed from the cylinders 89, 90 by means of the conveying bands 100,101.

The conversion of the coarse roving into fine yarn is effected suitably on the throstle (Fig. 13), as this machine alone allows of a considerable stretching or longitudinal expansion since it is furnished with a tubular arrangement 102 by means of which at the moment when the stretching is to be effected, the yarn receives a so-called false twist which holds the fibers together.

Having now particularly described and ascertained the nature of the said invention, and in what manner the same is to be performed, we declare that what we claim is:—

1. Process of treating waste oakum and similar material, which consists in carding it, beating it, treating it in a bath, dehydrating it by centrifugal action, again carding it, and finally drying it, substantially as specified.

2. Process of treating waste oakum and similar material, which consists in carding it, beating it, treating it in a first bath containing ammonia soda, washing it, treating it in a second bath containing caustic lye, again washing it, dehydrating it by centrifugal action, again carding it, and finally drying it, substantially as specified.

Signed by me at Dusseldorf Germany this twenty-second day of December 1906.

CH. LOUIS GELLERT.
CARL BUNSE.

Witnesses:
ALFRED POHLMEYER,
PETER LIEBER.